United States Patent [19]

Manzoni

[11] Patent Number: 4,477,199
[45] Date of Patent: Oct. 16, 1984

[54] DEVICE FOR INDEXING THE ARM OR CASTING OF A VEHICLE REARVIEW-MIRROR

[76] Inventor: Stephane Manzoni, 1, rue Pasteur, Saint-Claude, France, 39200

[21] Appl. No.: 345,301

[22] Filed: Feb. 3, 1982

[30] Foreign Application Priority Data

Feb. 6, 1981 [FR] France .................. 81 02402

[51] Int. Cl.³ .................. F16C 11/00; F16D 1/12
[52] U.S. Cl. .................. 403/93; 403/117; 16/332; 16/371
[58] Field of Search .................. 403/92, 93, 113, 117, 403/96; 16/371, 332, 334; 292/76, 91

[56] References Cited

U.S. PATENT DOCUMENTS

| | | | |
|---|---|---|---|
| 723,544 | 3/1903 | Petre | 403/117 |
| 1,050,518 | 1/1913 | Cogger | 403/117 |
| 1,116,714 | 11/1914 | Lang | 16/371 X |
| 2,083,140 | 6/1937 | Brantingson | 16/334 |
| 3,735,597 | 5/1973 | Guy | 403/113 X |
| 4,353,361 | 10/1982 | Foster | 403/117 X |

*Primary Examiner*—Richard J. Scanlan, Jr.
*Attorney, Agent, or Firm*—Remy J. VanOphem

[57] ABSTRACT

Device for indexing an arm supporting a rearview mirror or a rearview mirror casing, in which one of the ends of the indexing member is mounted for pivoting about an axis on the support member. The device includes a flange member of a deformable material provided in its center with a resting point by which it rests against the support member on which it is pivotally mounted and at its ends, with two resting points, one of which has locking provisions for locking it with the indexing member, the other cooperating with the indexing member for stretching the flange during the locking and unlocking operations only.

11 Claims, 3 Drawing Figures

DEVICE FOR INDEXING THE ARM OR CASTING OF A VEHICLE REARVIEW-MIRROR

BACKGROUND OF THE INVENTION

The present invention relates to a device for indexing the arm supporting a rearview mirror casing, or for indexing the casing of a vehicle rearview-mirror. It is known to use devices for holding the arm supporting a rearview-mirror casing, or the rearview mirror casing proper, in a predetermined position with respect to a supporting member fitted on the vehicle. These devices are also designed to allow the rearview-mirror casing to move in the event of impacts. These currently known indexing devices, however, are often complex and are composed of a rather large number of parts which makes them rather difficult to assemble and expensive to produce.

SUMMARY OF THE PRESENT INVENTION

It is the object of the present invention to overcome these disadvantages by providing an indexing member or arm device which includes a flange member constructed from deformable material provided in its center with a resting point by which it rests against the support member on which it is pivotally mounted and at its ends, with two resting points. One of the resting points is provided with means for locking the arm with the flange member The other of the resting points cooperate with means provided on the arm for stretching the flange member during the locking and unlocking operations only.

The indexing device according to the present invention is therefore made in one piece, which means that it is inexpensive to produce but insures a very reliable indexing of the arm or the casing of a rearview-mirror.

According to an important feature of the preferred embodiment of the present invention, the flange is permanently in an unstressed state, and is not deflected or stressed when the arm is either in the locking position or in a set-back position.

The locking member is only under stress over a short stroke to drive a locking projection of the flange into the resting point or to release it therefrom. To this effect, the internal or external radius of the indexing member is so shaped as to eliminate any resilient stress on the flange when the rearview mirror is placed in a set-back position.

This particular arrangement prevents the flange from being under constant stress, which would deform it permanently and result in an unreliable locking.

BRIEF DESCRIPTION OF THE DRAWING

The invention will be more readily understood on reading the following description with reference to the accompanying drawings, in which.

DETAILED DESCRIPTION OF THE PREFERRED EMBODIMENT

Figure 1:
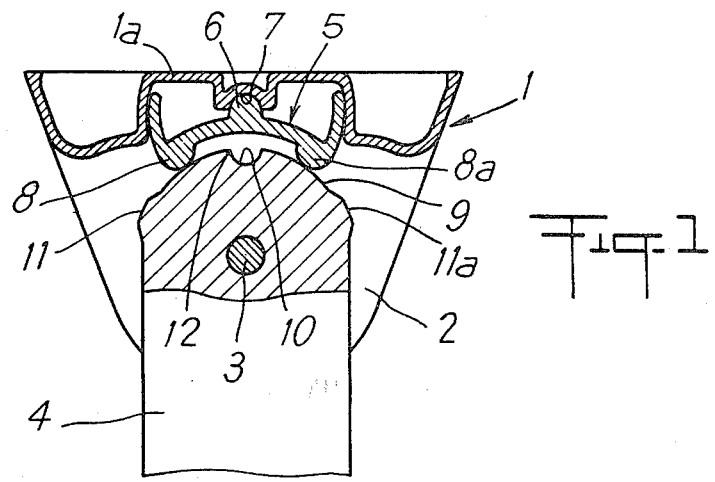
FIG. 1 is a plan view of a cross-section of the indexing device for the supporting arm of a rearview mirror in an intermediate position.
Figure 2:
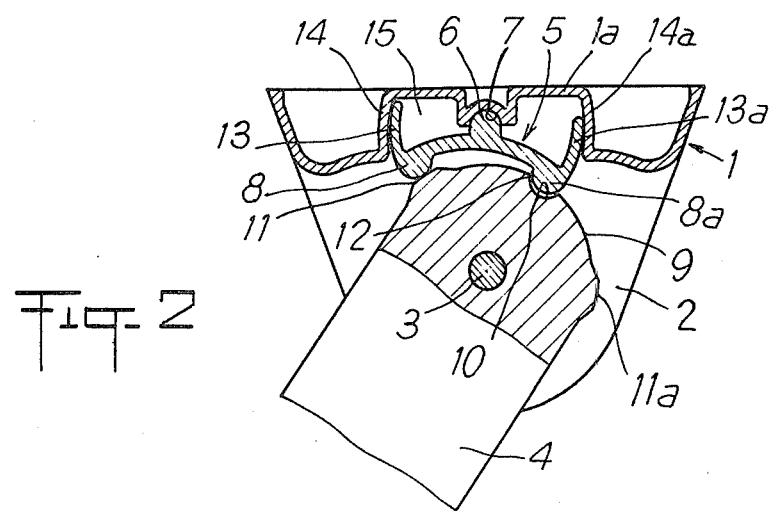
FIG. 2 is the same view of the indexing device with the arm in the locking position.
Figure 3:
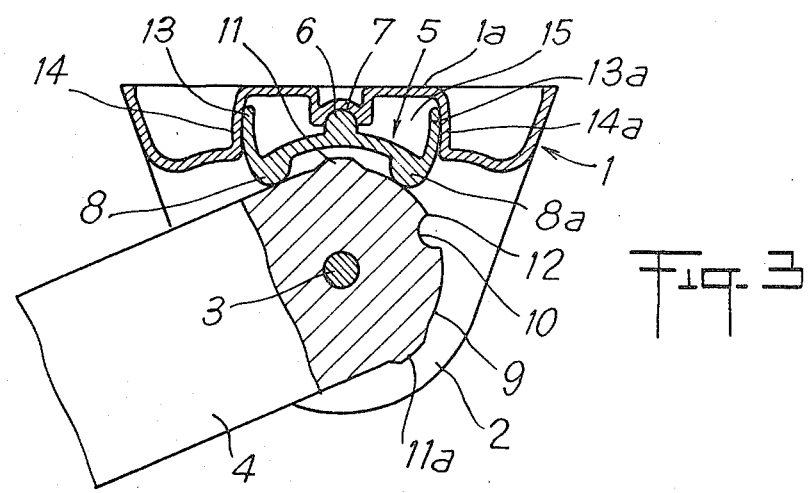
FIG. 3 is the same view of the indexing device with the arm in a set-back position.

FIGS. 1, 2 and 3 show a support member 1 which is fitted on the bodywork of a vehicle, not shown in the drawing. The support member is shaped as a fork of which only one of the branches 2 are shown in the drawing.

One of the ends of an indexing member of arm 4 is mounted for pivoting about an axle 3 between the branches 2 of the fork. The other end of the arm supports the casing for a vehicle rearview mirror, not shown in the drawing.

According to the invention, the indexing device includes a flange 5 consisting of a plate of deformable material, for example suitable plastic material such as polyacetals. The flange 5 is placed between the end of the arm 4 and a floor wall 1a of the support member. The flange 5 is provided in its center with a semi-circular rib 6 which is engaged in a corresponding groove 7 provided in the support member 1. The axis of the rib 6 is parallel to the axle 3 about which the arm pivots on the fork, so that the flange 5 is hinged by its central point on the support member 1. At the two free ends of the flange 5 on the face situated on the side of the arm 4, are provided two bosses 8 and 8a which are in contact with a cylindrical surface 9 on the end of the arm 4. The bosses 8 and 8a slide against the cylindrical surface 9, without straining the flange, when the arm 4 moves about a central or intermediate position, shown in FIG. 1, and about a setback position, shown in FIG. 3. In addition, the cylindrical surface 9 of the arm 4 is provided in its central part with a recess 10 which is selectively engageable with the bosses 8 and 8a of the flange, and thus constitutes a means for locking the arm in the indexed or locking position, as shown in FIG. 2.

On either side of the recess 10, the cylindrical surface 9 of the arm has two projecting parts 11 and 11a whose radius is greater than the radius of the cylindrical surface 9 and against which the bosses 8 and 8a of the flange 5 can selectively come to rest, as shown in FIG. 2.

When the arm 4 is in an indexing position illustrated in FIG. 2, the boss 8a is disposed inside the recess 10 and the boss 8 is resting against the projecting part 11; the higher position of the boss 8 is, however, compensated by the lowering of the boss 8a into the recess 10 and as a result no strain is exerted on the flange 5.

The flange 5 is strained when locking and unlocking occur over a short stroke, i.e. when the boss 8a goes over the ridge 12, which defines the edges of the recess 10, while the boss 8 is still in contact with the projecting part 11.

The flange 5 is also provided, on the side opposite the bosses 8 and 8a, with curved-in wings 13 and 13a which contact with the inner faces 14 and 14a bounding a recess 15 provided in the support member 1. The groove 7 and the semi-circular rib 6 are provided within the recess 15. In order to prevent any play in the hinged connection between the arm 4 and the support member 1 and to complement by creating an adjustable arm steering torque, two friction washers, not illustrated, are placed between the branches 2 of the fork and the end of the arm 4. The friction washers rest without mechanical stress on the faces of the fork which are traversed by the pivoting axle 3. The axle 3 preferably consists of the stem of a screw equipped with a regulating nut, not shown.

The device described hereinabove can also be applied according to the invention to a rearview mirror fitted on a car door. In this case, the device would be placed in a recess inside the foot by which the mirror casing is pivotally mounted on the base support, the base support being fitted on the bodywork of the vehicle.

The claims of the present invention are in no way limited to the description given hereinabove but, on the contrary, cover any modifications that can be brought thereto without departing from the scope thereof.

What is claimed is:

1. In a device for indexing an arm supporting a rearview mirror in which one of the ends of said arm is pivotally mounted on a support member and pivots about a first pivot axis, said support member being adapted to be mounted on a motor vehicle, the improvement comprising:
    a flange member formed of a resilient material and pivotally mounted on said support member, said flange member further pivoting about a second pivot axis parallel to said first pivot axis and spaced a predetermined distance therefrom;
    a partial right circular cylindrical surface on said arm, said partial right circular cylindrical surface being disposed between said first and second pivot axes and curved about said first pivot axis;
    a first and second abutment means extending from said flange member and each engaging said partial right circular cylindrical surface;
    a recess in said arm, said recess being selectively alignable with said first abutment means in a first predetermined angular position of said arm about said first pivot axis; and
    a third abutment means extending from said partial right circular cylindrical surface and selectively engageable with said second abutment means in said first predetermined angular position of said arm and in a first range of angular positions on either side of said first predetermined angular position such that said third abutment means cooperates with said second abutment means to resiliently deflect said flange member when said arm is in said first range of angular positions and pivots said first abutment means into said recess in said first predetermined angular position, said third abutment means thereby inhibiting rotation of said arm to and from said first predetermined position.

2. The improvement of claim 1 wherein said recess is selectively alignable with said second abutment means in a second predetermined angular position of said arm about said second pivot axis, said indexing device further comprising:
    a fourth abutment means extending from said cylindrical surface and selectively engageable with said second abutment means in said second predetermined angular position of said arm and in a second range of angular positions on either side of said second predetermined angular position such that said fourth abutment means cooperates with said second abutment means to resiliently deflect said flange member when said arm is in said second range of angular positions and pivots said first abutment means into said recess in said second predetermined angular position, said fourth abutment means thereby inhibiting rotation of said arm to and from said first predetermined angular position.

3. The indexing device of claim 1 wherein said support member and said flange member are provided with cooperating and abutting cylindrical surfaces defining said second pivot axis, said flange member being secured in position relative to said support member by being trapped between said support member and said arm.

4. The indexing device of claim 1 wherein said support member comprises a fork having a base portion and two branches extending therefrom in a parallel and spaced apart relationship, said arm being pivotally fastened between said branches of said fork and said flange member being disposed between said branches and between said arm and said base portion.

5. The indexing device of claim 1 wherein said flange member further comprises:
    a pivoting portion pivotally engaging said support member; and
    a flange portion extending from said pivoting portion in both directions therefrom generally transverse to the common plane of said first and second pivot axes, said first and second abutment means being formed on said flange portion on opposite sides of said pivoting portion.

6. The indexing device of claim 1 further comprising:
    a semi-circular groove formed in said support member centered on said second pivot axis; and
    a semi-circular rib formed in said flange member and centered on said second pivot axis, such that said flange member pivots about said second pivot axis when said rib is engaged in said groove.

7. The indexing device of claim 1 wherein said flange member is surrounded on five of its sides by said support member and is trapped in position on its fifth side by said arm.

8. An indexing device for indexing a rearview mirror with respect to a vehicle body comprising:
    a support member adapted to be mounted to said vehicle body having a support branch with an indexing axis therethrough spaced from said vehicle body, and further having support centering means with a flange axis spaced intermediate said vehicle body and said indexing axis and parallel thereto;
    an indexing member having a mirror end supporting one of a mirror and a mirror case, said indexing member further having an indexing end pivotably supported by said support branch about said indexing axis, said indexing end further having a cylindrical surface partly thereabout with an indexing recess therealong and an indexing abutment thereon spaced circumferentially from said indexing recess; and
    a flange member captured by and between said support member and said cylindrical surface, said flange member having flange centering means cooperating with said support centering means to center said flange member about said flange axis and further having a first and a second flange abutment spaced about said flange axis and extending towards and slidably engaging said cylindrical surface;
    whereby said cylindrical surface cooperates with one of said first and second flange abutments to establish an unlocked position of said indexing member about said indexing axis, and wherein said indexing recess cooperates with one of said first and second flange abutments while said indexing abutment cooperates with the other of said first and second flange abutments to define a locked position of said indexing member at a predetermined angular distance from said unlocked position.

9. An indexing device in accordance with claim 8, wherein said support centering means comprises one of a central groove and at least one side face spaced from said flange axis and wherein said flange centering means comprises one of a rib extending pivotably into said support groove and at least one wing portion extending from one of said first and second flange abutments to slidingly engage said at least one side face.

10. An indexing device in accordance with claim 9, wherein said at least one wing portion terminates in a tip adapted to abut a floor wall of said support member to limit the angular motion of said flange member about said flange axis.

11. An indexing device in accordance with claim 8, wherein said unlocked and locked positions comprise a respective first and a second angular position of said indexing member about said indexing axis.

* * * * *